(12) United States Patent
Sato

(10) Patent No.: US 11,460,340 B2
(45) Date of Patent: Oct. 4, 2022

(54) WEIGHING SYSTEM, ELECTRONIC SCALE, AND ELECTRONIC SCALE MARKER FOR PERFORMING INVENTORY MANAGEMENT

(71) Applicant: DSi Corporation, Tokyo (JP)

(72) Inventor: Hiroshi Sato, Tokyo (JP)

(73) Assignee: DSi Corporation, Tokyo (JP)

( * ) Notice: Subject to any disclaimer, the term of this patent is extended or adjusted under 35 U.S.C. 154(b) by 137 days.

(21) Appl. No.: 16/637,125

(22) PCT Filed: May 18, 2018

(86) PCT No.: PCT/JP2018/019376
§ 371 (c)(1),
(2) Date: Feb. 6, 2020

(87) PCT Pub. No.: WO2019/031020
PCT Pub. Date: Feb. 14, 2019

(65) Prior Publication Data
US 2020/0386609 A1    Dec. 10, 2020

(30) Foreign Application Priority Data

Aug. 9, 2017 (JP) .............................. JP2017-154328

(51) Int. Cl.
*G01G 23/36* (2006.01)
*G01G 23/32* (2006.01)
*G01G 23/42* (2006.01)

(52) U.S. Cl.
CPC .............. *G01G 23/36* (2013.01); *G01G 23/32* (2013.01); *G01G 23/42* (2013.01)

(58) Field of Classification Search
CPC ........ G01G 19/42; G01G 23/32; G01G 23/36; G01G 23/42
See application file for complete search history.

(56) References Cited

U.S. PATENT DOCUMENTS 4,839,675 A * 6/1989 Owen .................... A01K 97/00
                                            396/429
6,571,223 B1 * 5/2003 Vaghi .................... G06Q 10/04
                                            705/401

(Continued)

FOREIGN PATENT DOCUMENTS

CN          1429450 A       7/2003
CN        103295008 A       9/2013
(Continued)

OTHER PUBLICATIONS

Machine translation of CN203672468 (Year: 2014).*
(Continued)

*Primary Examiner* — Natalie Huls
(74) *Attorney, Agent, or Firm* — Faegre Drinker Biddle & Reath LLP

(57) ABSTRACT

There are provided a weighing system, an electronic scale, and an electronic scale marker for performing inventory management and the like for processing materials based on weight of processed products measured by an electronic scale. The weighing system includes an electronic scale that measures weight of a processed product and a terminal device. The electronic scale includes a display unit that displays the weight of the processed product and a marker that is provided in the vicinity of the display unit. The terminal device includes a data logger unit that performs character recognition processing within a region indicated by the marker based on an image, which is obtained by imaging the display unit, so as to acquire the weight of the processed product.

7 Claims, 6 Drawing Sheets

(56) References Cited

U.S. PATENT DOCUMENTS

| | | | |
|---|---|---|---|
| 6,600,482 B1 | 7/2003 | Leone, Jr. et al. | |
| 6,697,056 B1 | 2/2004 | Bergelson et al. | |
| 6,707,466 B1 | 3/2004 | Van Sickle et al. | |
| 8,752,758 B1* | 6/2014 | Klebe | G01G 23/01 |
| | | | 235/375 |
| 9,062,999 B2* | 6/2015 | Brouhard | G01G 23/44 |
| 9,891,094 B2* | 2/2018 | Cartwright | G06Q 10/087 |
| 10,810,540 B1* | 10/2020 | Gopal | G01G 19/387 |
| 11,103,160 B2* | 8/2021 | Emalfarb | A61B 5/1477 |
| 2006/0238346 A1* | 10/2006 | Teller | G07F 13/04 |
| | | | 340/572.1 |
| 2015/0138538 A1* | 5/2015 | Sakurai | G01J 3/26 |
| | | | 356/72 |
| 2016/0109281 A1 | 4/2016 | Herring et al. | |
| 2017/0220859 A1 | 8/2017 | Grams | |
| 2020/0341457 A1* | 10/2020 | Prugh | G01L 1/22 |

FOREIGN PATENT DOCUMENTS

| | | |
|---|---|---|
| CN | 103592016 A | 2/2014 |
| CN | 203672468 U | 6/2014 |
| CN | 107025430 A | 8/2017 |
| JP | H10-149435 A | 6/1998 |
| JP | H11-120320 A | 4/1999 |
| JP | 3092746 U | 3/2003 |
| JP | 2003-303222 A | 10/2003 |
| JP | 2008-276677 A | 11/2008 |
| JP | 2012-112855 A | 6/2012 |
| JP | 2014-167388 A | 9/2014 |
| JP | 2016-176818 A | 10/2016 |

OTHER PUBLICATIONS

Notification of the First Office Action dated Apr. 16, 2021 in Chinese Patent Application No. 2018800531543 (9 pages) with an English translation (11 pages).

* cited by examiner

| WEIGHT OF PROCESSED PRODUCT | COEFFICIENT |
|---|---|
| X1 GRAMS OR MORE TO LESS THAN X2 GRAMS | 1.1 |
| X2 GRAMS OR MORE TO LESS THAN X3 GRAMS | 1.2 |
| : | : |

WEIGHING SYSTEM, ELECTRONIC SCALE, AND ELECTRONIC SCALE MARKER FOR PERFORMING INVENTORY MANAGEMENT

CROSS REFERENCE TO PRIOR APPLICATIONS

This application is the National Stage of International Application No. PCT/JP2018/019376 filed May 18, 2018 and claims benefit of Japanese Application No. 2017-154328 filed Aug. 9, 2017, which are herein incorporated by reference in their entirety.

TECHNICAL FIELD

The present invention relates to a weighing system, an electronic scale, and an electronic scale marker for performing inventory management and the like for processing materials based on weight of processed products measured by an electronic scale.

BACKGROUND ART

A processed product made of a precious metal or the like (a dental technical product, for example; hereinafter referred to merely as a processed product) is produced by, for example, cutting and polishing a precious metal material or the like which is a raw material (hereinafter referred to merely as a processing material). A maker of a processed product generally calculates a cost for a processing material depending on weight of the processed product and charges an orderer the cost.

A scale is used for measuring weight of a processed product. Various electronic scales have been conventionally known, whose surfaces are provided with weighing trays, which measure weight of objects to be weighed that are laid on the weighing trays, which display the weight of the objects to be weighed as numerical values, and which include cameras that image the weighing trays.

Patent Literature 1, for instance, discloses an electronic kitchen scale which includes a weighing unit that is provided on a top surface of a scale body, a display unit that displays a weighing result and that is provided on a side surface of the scale body, a camera holding unit that is constructed between upper ends of supports stood on the top surface of the scale body, and a camera that images a tray laid on the weighing unit and that is provided on a bottom surface of the camera holding unit.

Patent Literature 2 describes a weighing device which includes a weighing tray on which an object to be weighed is to be laid and which is provided on a top surface of a device body, two supports which are stood on the top surface of the device body, a support member which is stretched between upper ends of the supports, a touch panel which is mounted on the support member, and a camera which images the object to be weighed and which is mounted below the touch panel.

PRIOR ART LITERATURE

Patent Literature

[Patent Literature 1] Japanese Patent Application Laid-Open No. 2014-167388
[Patent Literature 2] Japanese Patent Application Laid-Open No. 2016-176818

SUMMARY OF THE INVENTION

Problems to be Solved by the Invention

A maker of a processed product generally measures weight of a processed product with an electronic scale as those described in Patent Literatures 1 and 2, multiplies the measured weight by a certain coefficient which is greater than 1 (approximately 1.05 to 1.15) (hereinafter referred to as processing amount correction), and charges an orderer the cost corresponding to the weight subjected to the processing amount correction. Processing amount correction is processing that is performed for adding weight, which corresponds to a processing material which is lost during working such as cutting and polishing, to weight of a processed product. Here, the above-mentioned coefficient used for calculating the addition has been determined based on experience depending on kinds and sizes of processed products.

However, the above-mentioned processing amount correction has been complicated processing for a maker and has required certain man-hours. Further, determination of a coefficient based on experience of a maker has caused a feeling of opacity of orderers.

The present invention is made to solve such problems and an object of the present invention is to provide a weighing system, an electronic scale, and an electronic scale marker for performing inventory management and the like for processing materials based on weight of processed products measured by an electronic scale.

Means to Solve the Problems

A weighing system according to one embodiment of the present invention is characterized by including an electronic scale that measures weight of a processed product and a terminal device, in which the electronic scale includes a display unit that displays the weight of the processed product, and a marker that is provided in a vicinity of the display unit, and the terminal device includes a data logger unit that performs character recognition processing within a region indicated by the marker based on an image, which is obtained by imaging the display unit, so as to acquire the weight of the processed product.

The weighing system according to one embodiment of the present invention is characterized in that the marker is a mark, a line, a figure, or a frame for defining a region including the display unit.

The weighing system according to one embodiment of the present invention is characterized in that the data logger unit further executes processing amount correction for adding weight of a processing material, which is lost during working, to the weight of the processed product and outputs weight subjected to the processing amount correction.

An electronic scale according to one embodiment of the present invention that measures weight of a processed product is characterized by including: a display unit that displays the weight of the processed product; and a marker that is provided in a vicinity of the display unit and is used for performing character recognition processing within a region indicated by the marker based on an image, which is obtained by imaging the display unit by a terminal device, so as to acquire the weight of the processed product.

An electronic scale marker according to one embodiment of the present invention that is attached on an electronic scale, which measures weight of a processed product, is characterized in that the marker is attached in a vicinity of a display unit to form a region which is recognizable by a terminal device and character recognition processing is performed by the terminal device within the region indicated by the marker to acquire the weight of the processed product.

The electronic scale marker according to one embodiment of the present invention is characterized in that the electronic scale marker is a sticker which can be attached on a surface of the electronic scale.

Effects of the Invention

The present invention makes it possible to provide a weighing system, an electronic scale, and an electronic scale marker for performing inventory management and the like for processing materials based on weight of processed products measured by an electronic scale.

DETAILED DESCRIPTION OF THE EMBODIMENTS

Embodiments according to the present invention are described in detail below with reference to the accompanying drawings.

Embodiment 1

Figure 1:
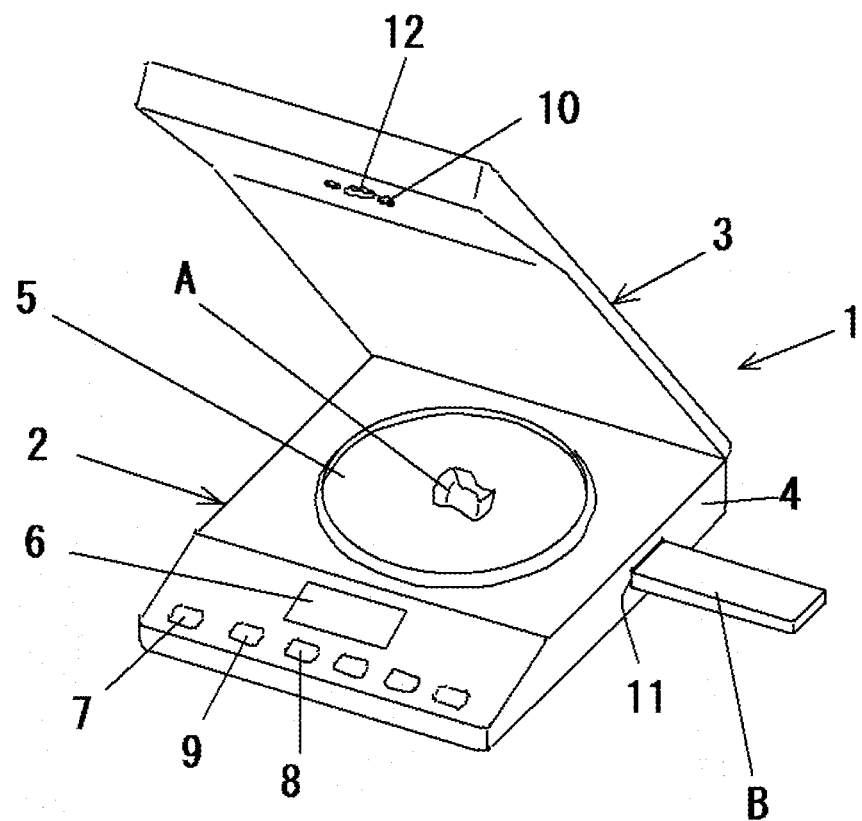
FIG. 1 is a perspective view of an electronic scale 1 having a lid member rising.
Figure 2:
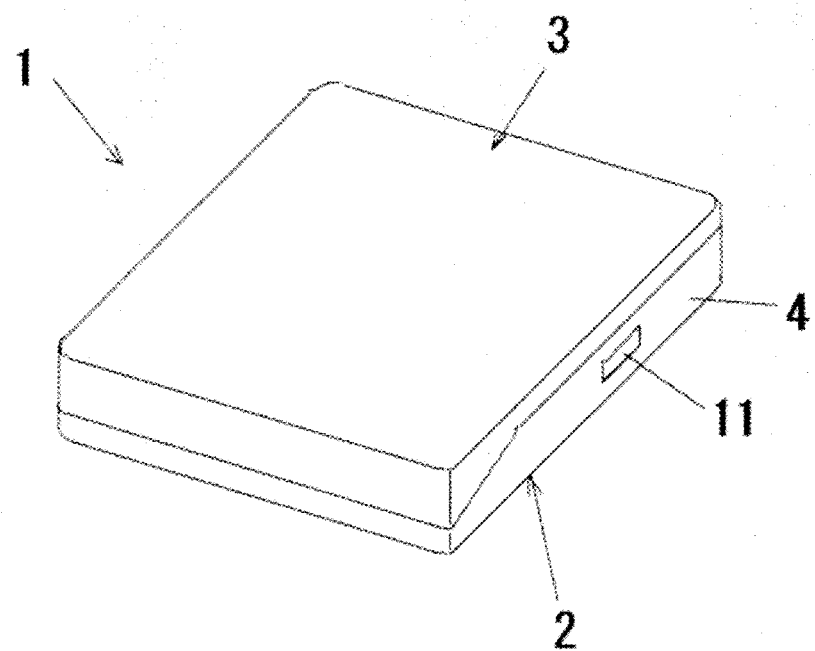
FIG. 2 is a perspective view of the electronic scale 1 having the lid member falling.
Figure 3:
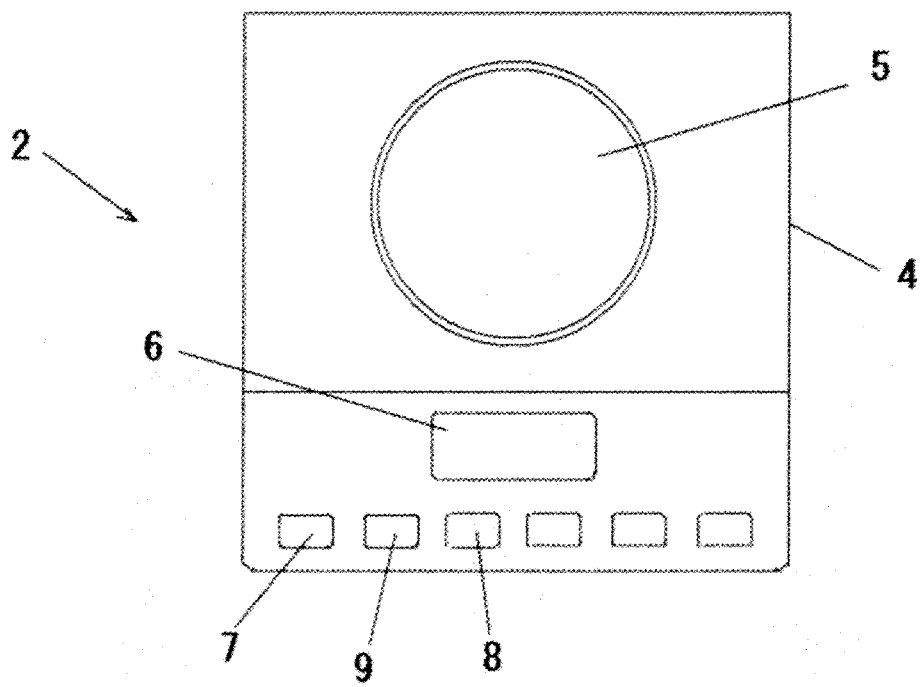
FIG. 3 is a plan view of a scale body of the electronic scale 1.

An electronic scale 1 used in Embodiment 1 according to the present invention is first described. FIGS. 1 to 3 are diagrams illustrating an example of the electronic scale 1. As illustrated in FIGS. 1 and 2, the electronic scale 1 includes a scale body 2 and a lid member 3 that is capable of closing a top surface of the scale body 2.

Peripheral surfaces of the scale body 2 are covered with a relatively flat case 4 made of resin and a top surface of the case 4 is provided with a weighing tray 5 on which an object A to be weighed is to be laid, a display unit 6 which displays the weight of the object A to be weighed, and various operation buttons such as an ON/OFF switch 7 and a reset button 9, as illustrated in FIG. 3.

A weight detection device that measures the weight of the object A to be weighed which is laid on the weighing tray 5, a control board that includes an operation unit, a storage unit, and the like, a power supply, and the like are incorporated in the case 4, though not illustrated. Preferably, a connector 11 for detachably connecting a storage medium B such as a USB memory is provided on a side surface of the case 4 (FIGS. 1 and 2).

The lid member 3 is mounted at one end of the scale body 2 so as to be able to rise and fall and so as to stop with a click in a state of rising to a predetermined angle. A camera 12 such as a CCD camera and a lighting system 10 such as an LED are installed on a surface of the lid member 3 that faces the scale body 2. The camera 12 is installed in and at a position and an angle that enable the camera 12 to image the top surface of the scale body 2 including the weighing tray 5 and the display unit 6 when the lid member 3 rises to the predetermined angle and stops with a click.

The lighting system 10 automatically emits light when the object A to be weighed is laid on the weighing tray 5 or emits light upon operation of an operation button, and thereby radiates the light toward the top surface of the scale body 2 including the weighing tray 5 and the display unit 6. Here, angles of the camera 12 and the lighting system 10 may be set to be adjustable.

When the object A to be weighed is laid on the weighing tray 5 after exposure of the surface of the scale body 2 with the rising of the lid member 3 to the predetermined angle and attainment of drive status with operation of the ON/OFF switch 7, the weight detection device measures the weight of the object A to be weighed and the weight is displayed as numerals on the display unit 6.

Figure 9:
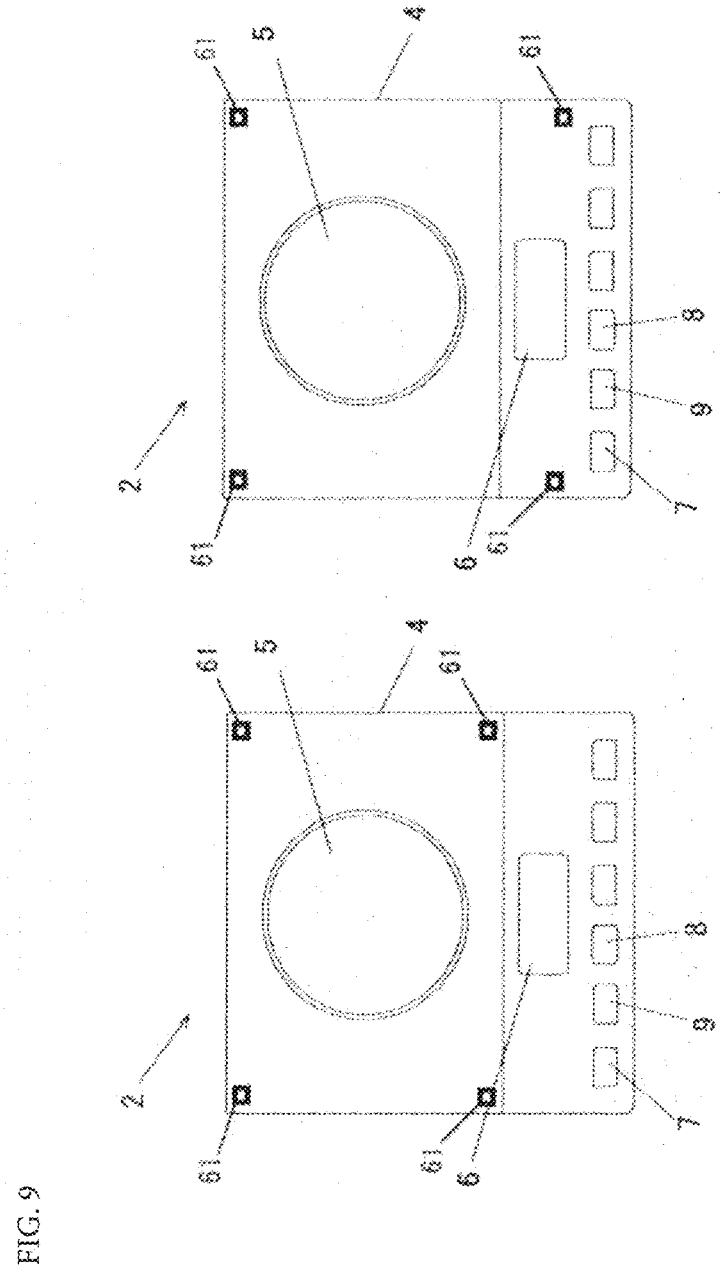
FIG. 9 is a diagram for explaining an example in which markers having a predetermined color or shape are provided on two or more positions (four corners, for example) on a top surface of the scale body.

Subsequently, the camera 12 images the top surface of the scale body 2 including the weighing tray 5 and the display unit 6 and image data obtained through imaging by the camera 12 is saved in the storage unit of the control board. At this time, the camera 12 preferably performs imaging so that one image includes both of the object A to be weighed which is laid on the weighing tray 5 and the weight of the object A to be weighed which is displayed on the display unit 6. The imaging by the camera 12 may be automatically carried out after the weight is displayed on the display unit 6 or may be carried out upon operation of an operation button. Further, keystone correction processing may be performed as needed after the imaging by the camera 12. For example, markers 61 having a predetermined color or shape may be provided on two or more positions (four corners, for example) on the top surface of the scale body 2 so as to facilitate the keystone correction processing, as illustrated in FIG. 9. In this case, keystone correction is performed based on the markers 61, thereby being able to perform accurate and secure processing.

If the storage medium B is connected to the connector 11 of the scale body 2 in advance, image data obtained through imaging by the camera 12 can also be saved in the storage medium B. The electronic scale 1 may transmit the weight of the object A to be weighed that is a measurement result and the image data obtained through the imaging by the camera 12 to electronic equipment, which is not illustrated, external to the electronic scale 1 with use of wireless communication standards such as Bluetooth (registered trademark) and WiFi and other wired or wireless communication means.

Figure 4:
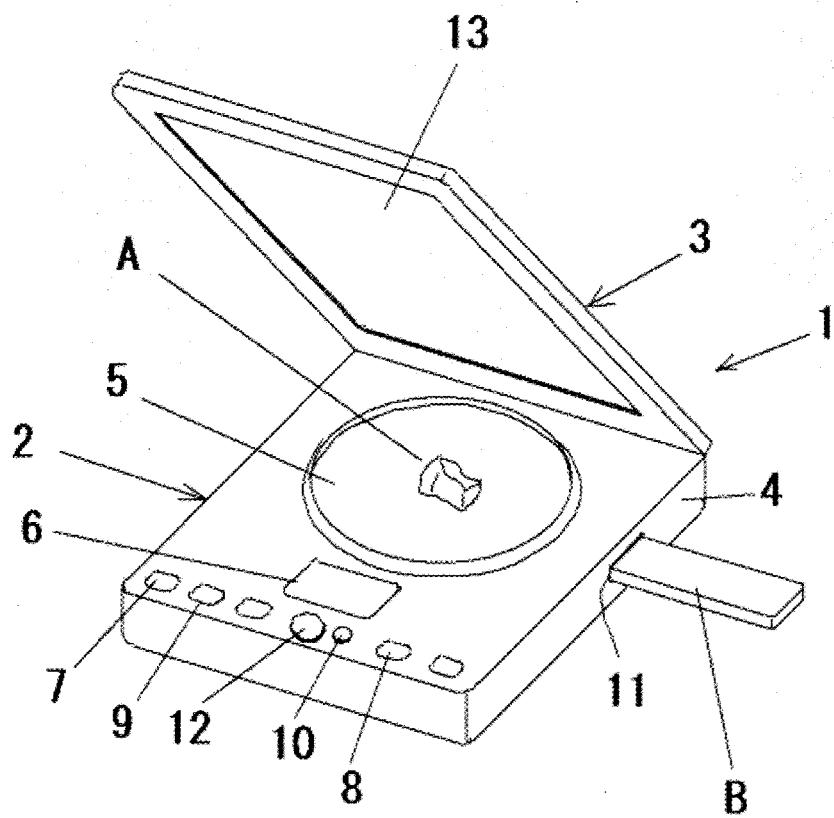
FIG. 4 is a perspective view of the electronic scale 1 having a lid member rising.

FIG. 4 illustrates another example of the electronic scale 1. In this example, the camera 12 and the lighting system 10 are provided on the top surface of the scale body 2. The lid member 3 includes a reflection means 13 on a surface thereof that faces the scale body 2. The reflection means 13 reflects an image of the top surface of the scale body 2 including the weighing tray 5 and the display unit 6 toward the camera 12 when the lid member 3 rises to a predetermined angle. The reflection means 13 may be a mirror or a metal deposition layer having high reflectance, for instance.

Accordingly, upon the rising of the lid member 3 to the predetermined angle, the operation of the ON/OFF switch 7, and laying of the object A to be weighed on the weighing tray 5, the weight of the object A to be weighed is displayed on the display unit 6 and the reflection means 13 reflects the image of the top surface of the scale body 2 toward the camera 12. Thus, the camera 12 images the object A to be weighed on the weighing tray 5 and the display unit 6 on which the weight is displayed together. For a reason that other configurations and other methods of use are the same as those of the embodiment illustrated in FIGS. 1 to 3, identical parts are provided with common reference characters and detailed description thereof is omitted.

Figures 5, 6:
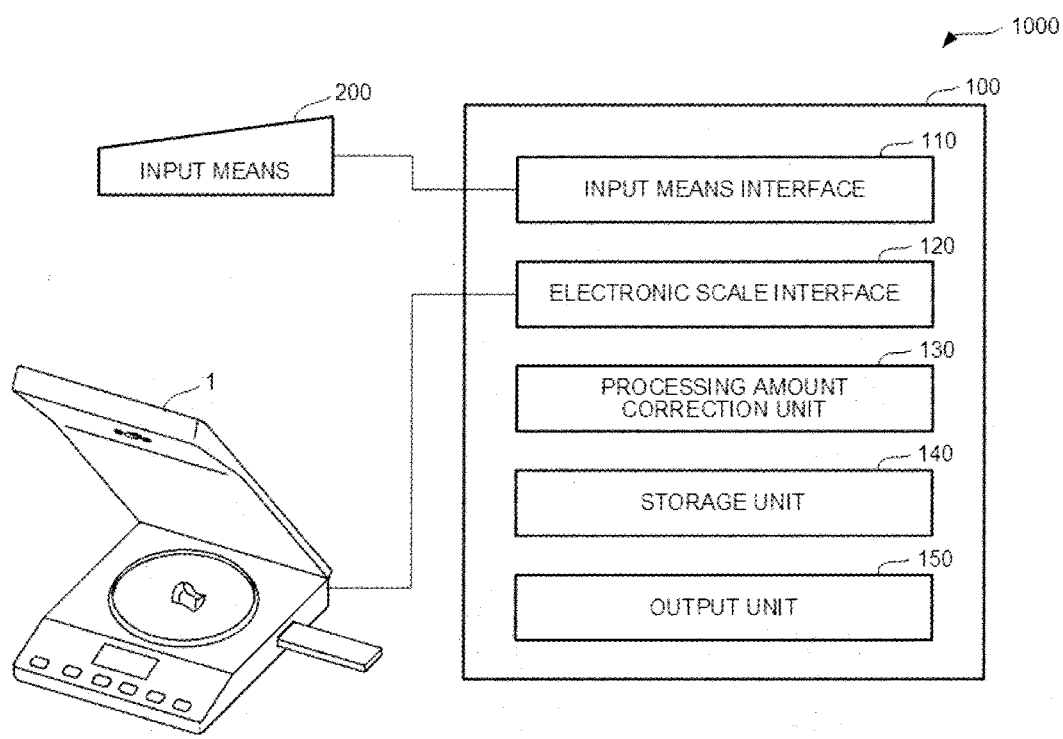
FIG. 5 is a block diagram illustrating the configuration of a weighing system 1000 for processing materials.
FIG. 6 is a diagram illustrating an example of processing of a processing amount correction unit 130.

A weighing system 1000 for processing materials that includes the electronic scale 1 is now described. FIG. 5 is a block diagram illustrating an example of the functional configuration of the weighing system 1000. The weighing system 1000 includes a management device 100, an input means 200, and the electronic scale 1.

The management device 100 includes an input means interface 110, an electronic scale interface 120, a processing amount correction unit 130, a storage unit 140, and an output unit 150. The management device 100 includes a central processing unit (CPU) and a storage device, and each of the above-mentioned processing units is logically realized through execution of a program, which is stored in the storage device, by the CPU. The management device 100 may be a single device or may be a computer system realized through parallel processing or distributed processing performed by a plurality of devices. The management device 100 is disposed in the same network as that of the input means 200 and the electronic scale 1 or directly connected with the input means 200 and the electronic scale 1 most often, but may be disposed remote from the input means 200 and the electronic scale 1 via a wide area network such as Internet. For example, the management device 100 may be a smartphone, a tablet terminal, a personal computer, or the like, or may be implemented as a so-called cloud service.

The input means interface 110 is connected with the input means 200 so that wired- or wireless-communication can be performed. The input means interface 110 acquires information and the like for identifying a processed product via the input means 200. The input means 200 can typically be a bar code scanner, a keyboard, an image recognizable imaging unit, an IC tag reader, or the like, but is not limited to these. The input means 200 reads a bar code or the like described on, for example, an labo slip sent from a dental clinic, acquires identification information by which an order can be uniquely identified (hereinafter referred to merely as identification information), and outputs the identification information to the input means interface 110.

Further, the input means interface 110 may be configured to acquire information related to working which is inputted by a user with the input means 200. Examples of the information related to working can include a material used for working, information for identifying a working base, information for identifying a working operator, information for identifying an orderer, and information for identifying a working process. In production work for dental technical products, for example, the working process includes steps for material warehousing, material shipping (taking out), feeder head, pre-polishing, post-polishing, excessive material collection, and the like. Every time a user executes at least one of these steps, the user can perform weighing of a material and recording by using the weighing system 1000.

Identification information is generally stored in a manner to be associated with information related to an order, in a management system which is not illustrated. The information related to an order can include information for a kind of a processed product (position of a tooth, for example), a material to be used, a size of a processed product, and the like, for example.

The electronic scale interface 120 is connected with the electronic scale 1 so that a wired- or wireless-communication can be performed. The electronic scale 1 outputs at least a measurement value of weight of a processed product to the electronic scale interface 120. Preferably, the electronic scale 1 may output image data obtained through imaging by the camera 12, that is, image data which includes both of the object A to be weighed which is laid on the weighing tray 5 and the weight of the object A to be weighed which is displayed on the display unit 6, in a manner to associate the image data with weight of a processed product. The electronic scale interface 120 outputs weight of a processed product to the processing amount correction unit 130. Alternatively, when the processing amount correction processing is not required, the electronic scale interface 120 outputs weight of a processed product to the storage unit 140 or the output unit 150.

In order to add weight of a processing material, which is lost during working, to weight of a processed product, the processing amount correction unit 130 performs processing amount correction processing in which the processing amount correction unit 130 acquires a measurement value of the weight of the processed product outputted from the electronic scale interface 120 and multiplies the measurement value by a certain coefficient which is greater than 1 (approximately 1.05 to 1.15). For example, the processing amount correction unit 130 holds a correction table as that illustrated in FIG. 6 in a storage region which is not illustrated. The correction table in FIG. 6 is a table which associates weight of completed processed products with coefficients. In this case, the processing amount correction unit 130 refers to the correction table and acquires a coefficient corresponding to weight of a processed product acquired by the electronic scale interface 120. Then, the weight of the processed product is multiplied by the coefficient to obtain weight subjected to the processing amount correction.

Here, the format of the correction table is not limited to this, but the correction table may be formed so that a coefficient can be specified depending on a kind (position of a tooth, for example), a material, and a size of a processed product, a combination of these, and the like, for example. In this case, the processing amount correction unit 130 can acquire information of a kind (position of a tooth, for example), a material, a size, and the like of a processed product from an labo slip management system, which is not illustrated, by using the above-mentioned labo slip identification information. Alternatively, the processing amount correction unit 130 may directly acquire these pieces of information which are inputted by a user via the above-mentioned input means 200 or the like.

The processing amount correction unit 130 may include a conversion formula for outputting a coefficient or weight after correction by using weight of a processed product as an input, a statistical model, a model subjected to machine learning, and the like, instead of the correction table.

The processing amount correction unit 130 outputs weight subjected to the processing amount correction to the storage unit 140 or the output unit 150. Preferably, identification information acquired by the input means interface 110 and image data acquired by the electronic scale interface 120 are outputted in a manner to be associated with weight subjected to processing amount correction.

The storage unit 140 acquires and stores weight subjected to the processing amount correction from the processing amount correction unit 130. Alternatively, the storage unit 140 acquires and stores weight of a processed product from the electronic scale interface 120. Preferably, the storage unit 140 stores the weight in a manner to associate the weight with identification information, image data, and the like.

The output unit 150 acquires weight subjected to the processing amount correction from the processing amount correction unit 130 and outputs the weight to the outside. Alternatively, the output unit 150 acquires weight of a processed product from the electronic scale interface 120 and outputs the weight to the outside. Preferably, the output unit 150 outputs the weight in a manner to associate the weight with identification information, image data, and the like.

Information stored in the storage unit 140 and information outputted from the output unit 150 can be utilized for description to a delivery statement, description to an invoice, registration to an order placement and order reception management system, inventory management of processing materials in an office of a maker, and the like, for example.

A purchasing amount and a taking amount have been conventionally managed in a dental laboratory such that a purchasing amount is manually inputted into a management system when a processing material is purchased and a person in charge of working manually inputs a taking amount into the management system when the person takes out a processing material. However, it has been difficult to manage a use amount of a processing material. This is because lost weight of a processing material which is lost during working such as cutting and polishing has not been able to be measured and the actually used amount for the working has not been clear. In regard to this point, according to the present embodiment, a use amount of a processing material and a lost amount of a processing material lost during working can be automatically calculated and recorded on every important point in the working process. Accordingly, inventory management of processing materials can be performed by reference to the recorded data. That is, a use amount and a stock amount of a processing material at a certain time point up to the present can be specified. Further, past result values can be used for estimating a use amount and a stock amount of a processing material at a certain time point in the future. Furthermore, a use amount of a processing material and weight of a processed product can be specified so as to calculate a loss rate of the processing material for each working base or working operator. Such information is useful when instructing a working operator, for example. In addition, weight data (a measurement value of the weight of the object A to be worked or a numerical value representing weight obtained by performing processing amount correction to a measurement value) is saved or outputted in a manner to be associated with image data obtained through imaging by the camera 12, that is, image data which includes both of the object A to be weighed which is laid on the weighing tray 5 and the weight of the object A to be weighed which is displayed on the display unit 6, being able to leave a physical evidence showing that the weight data is certainly data of the object A to be weighed.

Further, since a use amount of a processing material has been conventionally calculated based on experience, a calculation standard has varied depending on a person in charge of working or a dental laboratory, causing a feeling of opacity of orderers. However, according to the present invention, the processing amount correction can be performed based on a consistent standard. Accordingly, a breakdown of a working cost is clear for an orderer.

Further, some dentists purchase processing materials by themselves and deposit the processing materials to a dental laboratory to allow the dental laboratory to perform working. In such a case, the output unit 150 may calculate a stock amount of a processing material and the like based on purchasing results and using results (or prediction values) of the processing material, for example, and exhibit the stock amount and the like to dentists or the like. Further, the output unit 150 may issue an alert for promoting purchase or may automatically execute order placement processing when a predetermined stock amount becomes lower than a threshold value, for example.

Further, it is a merit also for dental laboratories that all persons in charge of working perform the processing amount correction based on the identical standard. For example, the output unit 150 is also capable of determining a working technical level and presence of frauds depending on whether or not there is discordance between a taking amount of a processing material and a use amount subjected to the processing amount correction.

Embodiment 2

Figure 7:
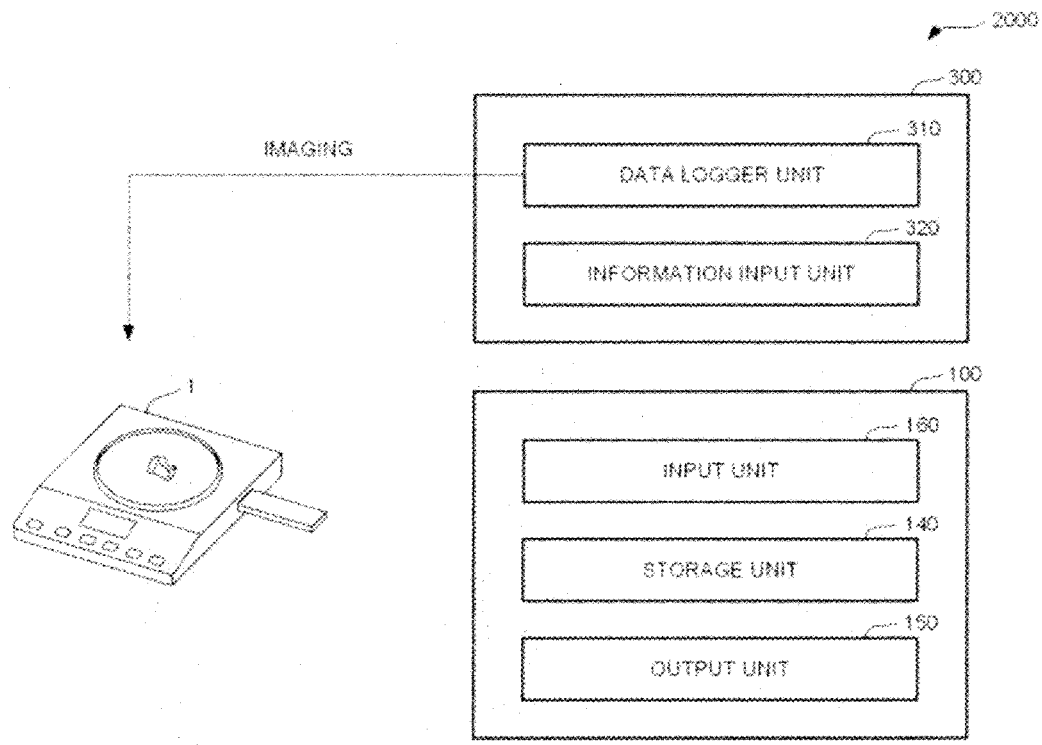
FIG. 7 is a block diagram illustrating the configuration of a weighing system 2000 for processing materials.

FIG. 7 illustrates the configuration of a weighing system 2000 according to Embodiment 2. The weighing system 2000 includes an electronic scale 1, a management device 100, and a terminal device 300.

The electronic scale 1 in Embodiment 2 has a scale body 2. The configuration of the scale body 2 is the same as that in Embodiment 1. That is, the scale body 2 includes a case 4 and a top surface of the case 4 is provided with a weighing tray 5 on which an object A to be weighed is to be laid, a display unit 6 which displays the weight of the object A to be weighed, an ON/OFF switch 7, a reset button 9, and the like. A weight detection device that measures the weight of the object A to be weighed which is laid on the weighing tray 5, a control board that includes an operation unit, a storage unit, and the like, a power supply, and the like are incorporated in the case 4.

The terminal device 300 includes a data logger unit 310 and an information input unit 320. The terminal device 300 is preferably a portable information processing terminal and typically a smart device such as a smartphone and a tablet terminal. The terminal device 300 includes hardware such as a CPU, a memory, an input output device (including a wired or wireless communication device, an output device such as a display device, and an input device such as a touch panel), and a camera, and functions of the data logger unit 310 and the information input unit 320 are logically realized through execution of a program by the CPU.

The data logger unit 310 acquires an image of the display unit 6 of the electronic scale 1 on which the weight of the object A to be weighed is displayed, by using the camera of the terminal device 300. The data logger unit 310 is capable of displaying a mark, a frame, or the like for adjusting a position of the display unit 6 on a screen of the terminal device 300 during imaging. A user picks up an image of the display unit 6 while matching a position to the mark or the frame. The data logger unit 310 then executes character recognition processing within a region indicated by the mark or the frame in the character recognition processing described later. Thus, a processing target region in which characters are recognized can be limited in an image, so that time for the character recognition processing can be shortened and recognition accuracy can be improved.

Figure 10:
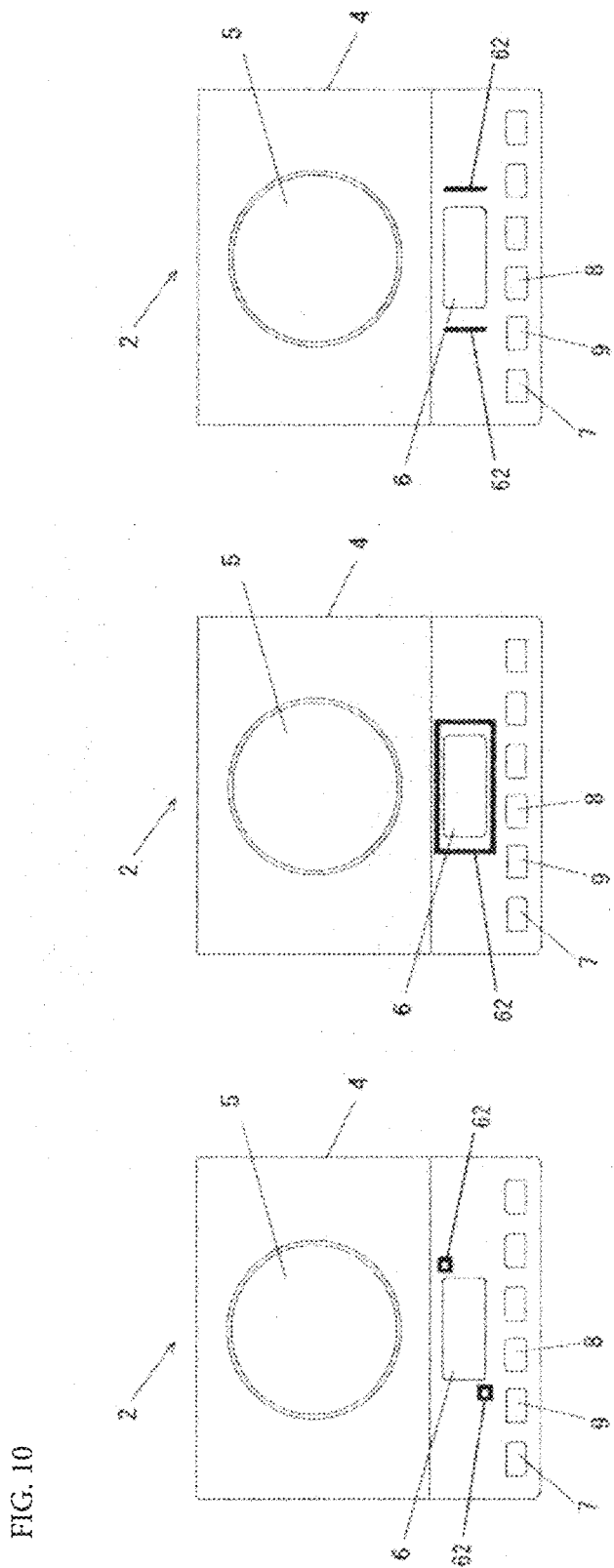
FIG. 10 is a diagram for explaining an example in which markers are provided on predetermined positions in the vicinity of a display unit of the electronic scale.

Alternatively, a marker 62 (a mark, a frame, or the like) which can be recognized by the data logger unit 310 may be drawn on a predetermined position in the vicinity of the display unit 6 of the electronic scale 1, as illustrated in FIG. 10. The marker 62 may be a mark indicating an end point (typically a corner portion) of an arbitrary region (typically a rectangular region) surrounding the display unit 6, a segment or a figure indicating a part of the region, or a frame indicating the shape of the region, for example. The marker 62 is typically attached on the electronic scale 1 and formed by being printed on the top surface of the scale body 2 when the marker 62 is a mark and a frame or by sticking a predetermined sticker or the like, which can be attached on an electronic scale. The data logger unit 310 first recognizes this mark or frame in an image and then executes the character recognition processing within a region indicated by the mark or the frame, in the later-described character recognition processing. A processing target region for extracting characters from an image can be thus limited, being able to shorten time required for the character recognition processing and to improve recognition accuracy.

Further, the data logger unit 310 may perform keystone correction processing as needed after imaging. In order to facilitate the keystone correction processing, the markers 61 having a predetermined color or shape may be provided on four corners, for example, of the top surface of the scale body 2. In this case, keystone correction is performed based on the markers 61, thereby being able to perform accurate and secure processing. Above-described marks or frame serving as the markers 62 which are drawn on the top surface of the scale body 2 and define a region including the display unit may be also used as the markers 61 for keystone correction of a region including the display unit.

When the data logger unit 310 acquires an image including the display unit 6, the data logger unit 310 recognizes characters in the image and outputs the recognition result as numerical data representing the weight of the object A to be weighed. Since the character recognition processing from an image, that is, optical character recognition (OCR) is feasible by known art, detailed description thereof is omitted here. In the present embodiment, the data logger unit 310 displays a mark, a frame, or the like for adjusting a position of the display unit 6 in imaging on a screen of the terminal device 300, or a mark, a frame, or the like which can be recognized by the data logger unit 310 is provided on a predetermined position in the vicinity of the display unit 6, being able to improve time and accuracy of the character recognition processing, as described above.

The data logger unit 310 may sequentially execute the character recognition processing whenever an image is picked up or may collectively execute the character recognition processing after a plurality of images are picked up. Further, the data logger unit 310 may include a user interface which is used for making a user recognize whether or not a character recognition result is correct and for making the user correct the character recognition result as needed. For example, a picked-up image, a character recognition result based on the image, a button for accepting the character recognition result, a keypad for editing the character recognition result, and the like can be displayed on the screen.

In imaging the display unit 6 of the electronic scale 1, the data logger unit 310 preferably picks up the image also including the object A to be weighed which is laid on the weighing tray 5. It is possible to leave a physical evidence indicating that the numerical data outputted by the data logger unit 310 certainly represents the weight of the object A to be weighed.

The data logger unit 310 transmits the numerical data representing the weight of the object A to be weighed to the management device 100 by using the wired or wireless communication device of the terminal device 300. The communication device is capable of transmitting data by using the wireless communication standards such as Bluetooth (registered trademark) and WiFi, for example. The data logger unit 310 may transmit, to the management device 100, a picked-up image in a manner to associate the image with the weight of the object A to be weighed. Accordingly, information supporting the measurement result can be securely left.

More preferably, the data logger unit 310 performs the processing amount correction processing to the numerical data representing the weight of the object A to be weighed and then transmits the weight data subjected to the processing amount correction to the management device 100. The contents of the processing amount correction processing are the same as the above-described contents of the processing performed by the processing amount correction unit 130. That is, the data logger unit 310 multiplies the numerical data representing the weight of the object A to be weighed by a certain coefficient which is greater than 1 (approximately 1.05 to 1.15) so as to calculate weight data subjected to the processing amount correction. A coefficient may be provided by an arbitrary conversion formula, a statistical model, a model subjected to machine learning, or the like as well as the correction table as that illustrated in FIG. 6. Further, a coefficient may vary depending on a kind (position of a tooth, for example), a material, a size, and the like of a processed product. In this case, information of a kind (position of a tooth, for example), a material, a size, and the like of a processed product may be directly inputted via the input device of the terminal device 300 or may be provided via the information input unit 320 described later.

The information input unit 320 acquires information and the like for identifying a processed product by using the camera or the input device of the terminal device 300. For example, the camera of the terminal device 300 reads a bar code or the like described on an labo slip so as to acquire identification information by which an order can be uniquely identified. The information input unit 320 transmits the acquired identification information to the management device 100. The information input unit 320 may transmit an image including the bar code or the like together to the management device 100. Preferably, identification information which is acquired by the information input unit 320 and weight data which is acquired or generated by the data logger unit 310 are outputted together to the management device 100. In other words, identification information and weight data are outputted to the management device 100 in an associated manner.

Here, the data logger unit 310 and the information input unit 320 may be implemented in an integrated manner. For example, the camera of the terminal device 300 images the object A to be weighed which is laid on the weighing tray 5, the display unit 6 of the electronic scale 1 on which the weight of the object A to be weighed is displayed, and a bar code or the like which is described on an labo slip, at a time. The data logger unit 310 and the information input unit 320 may each acquire the weight data (numerical data representing the weight of the object A to be weighed or numerical data obtained by performing the processing amount correction to the weight of the object A to be weighed) and the identification information from this single image. Accordingly, a user can more simply record the weighing result.

The management device 100 includes an input unit 160, a storage unit 140, and an output unit 150. The management device 100 is an information processing device and may preferably be a personal computer or a server computer implemented as a so-called cloud service. The management device 100 includes hardware such as a CPU, a memory, and an input output device (including a wired or wireless communication device, an output device such as a display device, and an input device such as a keyboard), and functions of the input unit 160, the storage unit 140, and the output unit 150 are logically realized through execution of a program by the CPU.

The input unit 160 receives identification information which is acquired by the information input unit 320, weight data which is acquired or generated by the data logger unit 310, image data, and the like from the terminal device 300 via a wired or wireless communication device.

The storage unit 140 stores weight data subjected to the processing amount correction in a manner to associate the weight data with identification information, image data, and the like. The output unit 150 outputs weight subjected to the processing amount correction to the outside. Preferably, the weight subjected to the processing amount correction can be outputted with the identification information, the image data, and the like. Information stored in the storage unit 140 and information outputted from the output unit 150 can be utilized for description to a delivery statement, description to an invoice, registration to an order placement and order reception management system, inventory management of processing materials in an office of a maker, and the like, for example.

When the data logger unit 310 of the terminal device 300 does not execute the processing amount correction processing, the management device 100 may include the processing amount correction unit 130 as is the case with Embodiment 1. In this case, the processing amount correction unit 130 performs the processing amount correction processing based on numerical data which is acquired by the data logger unit 310 and represents the weight of the object A to be weighed.

Embodiment 3

In Embodiment 3, the terminal device 300 does not recognize characters displayed on the display unit 6 of the electronic scale 1, but the electronic scale 1 transmits weight data which is a measurement result to the terminal device 300. Accordingly, the character recognition processing in the terminal device 300 can be omitted.

Figure 8:
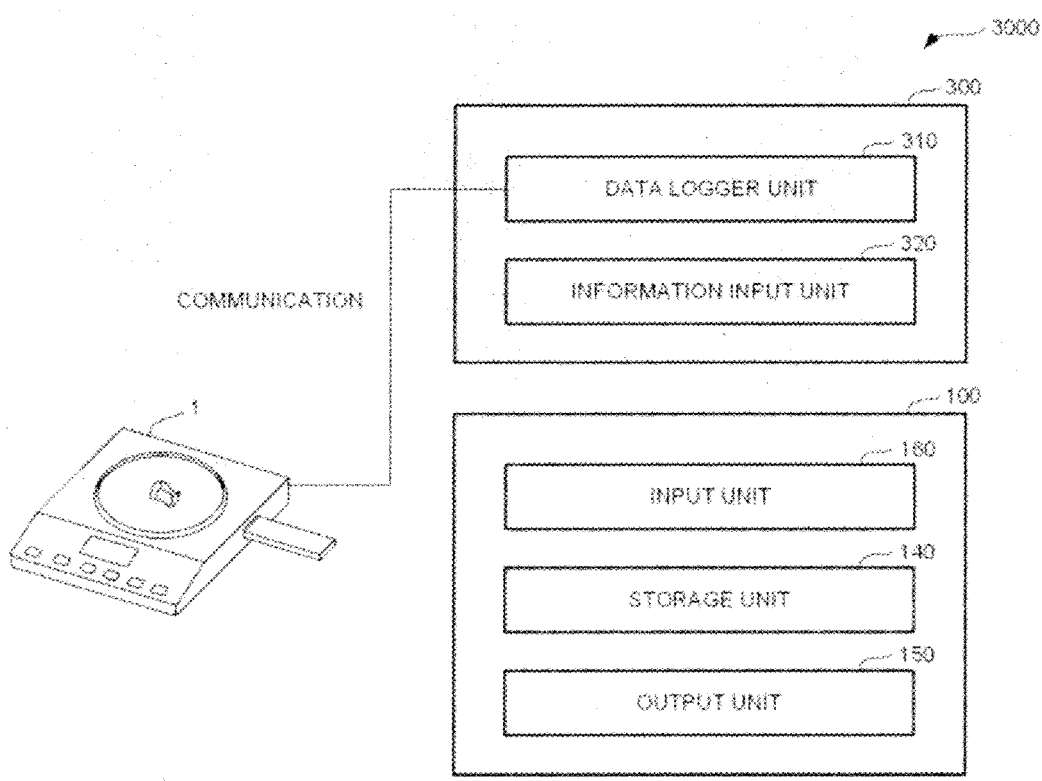
FIG. 8 is a block diagram illustrating the configuration of a weighing system 3000 for processing materials.

FIG. 8 illustrates the configuration of a weighing system 3000 according to Embodiment 3. The weighing system 3000 includes an electronic scale 1, a management device 100, and a terminal device 300. Compared to Embodiment 2, the configurations of the electronic scale 1 and the terminal device 300 are partially different, but other configurations are the same as those in Embodiment 2. Differences from Embodiment 2 are mainly described and description of the same points is omitted here.

The electronic scale 1 according to the present embodiment includes a wired or wireless communication device for transmitting the weight of the object A to be weighed, which is a measurement result, to the outside. The electronic scale 1 is typically capable of transmitting data by using the wireless communication standards such as Bluetooth (registered trademark) and WiFi. The electronic scale 1 displays a measurement result of the weight of the object A to be weighed on the display unit 6 and transmits the measurement result to the data logger unit 310 of the terminal device 300 via the wired or wireless communication device.

The data logger unit 310 of the terminal device 300 according to the present embodiment receives the weight data of the weight of the object A to be weighed from the electronic scale 1 via the wired or wireless communication device. Further, the data logger unit 310 is capable of picking up an image including both of the object A to be weighed which is laid on the weighing tray 5 and the display unit 6 of the electronic scale 1 on which the weight of the object A to be weighed is displayed, by using the camera of the terminal device 300. The data logger unit 310 transmits the weight data to the management device 100. At this time, the weight data is preferably transmitted in a manner to be associated with the picked-up image. Accordingly, information supporting the measurement result can be securely left. In the present embodiment as well, the data logger unit 310 may perform the processing amount correction processing.

The information input unit 320 of the terminal device 300 and the management device 100 operate similarly to Embodiment 2. Accordingly, weight data and identification data are stored in the storage unit 140 of the management device 100 in an associated manner.

Note that the present invention is not limited to the above-described embodiments and can be altered as appropriate without deviating from the intention of the invention. For example, the above-described embodiments describe the example in which a user of the terminal device 300 accepts and corrects a character recognition result from an image, but the configuration for making another user accept and correct a character recognition result may be employed. For example, a user interface for accepting and correcting a character recognition result may be provided to the management device 100. Accordingly, administrators of dental laboratories, dentists of dental clinics, and the like can check a physical evidence of weight data and correct weight data as needed, for example.

Further, the above-described embodiments describe the production work for dental technical products as an example. However, the present invention is not limited to this but may be applicable to various works requiring inventory management of processing materials. Specifically, the present invention is easily applied to ornament production in which metal materials are worked. Further, each processing means constituting the present invention may be composed of hardware or may be logically realized by making a CPU execute arbitrary processing based on a program. A program can be supplied to a computer by various types of transitory- or non-transitory media.

The present application claims priority based on Japanese Patent Application No. 2017-154328 which was filed on Aug. 9, 2017 and contents thereof are incorporated herein.

DESCRIPTION OF REFERENCE NUMERALS

A object to be weighed
B storage medium
1 electronic scale
2 scale body
3 lid member
4 case
5 weighing tray 6 display unit
61 marker
62 marker
7 ON/OFF switch
8 processing amount correction operation button
9 reset button
10 lighting system
11 connector
12 camera
13 reflection means
100 management device
110 input means interface
120 electronic scale interface
130 processing amount correction unit
140 storage unit
150 output unit
200 input means
300 terminal device
310 data logger unit
320 information input unit
1000 weighing system

What is claimed is:

1. A weighing system comprising:
an electronic scale that measures weight of a processed product; and
a terminal device, wherein
the electronic scale includes
a display unit that displays the weight of the processed product, and
a marker that is provided in a vicinity of the display unit, and
the terminal device includes a data logger unit that performs character recognition processing within a region indicated by the marker based on an image, the image being obtained by imaging the display unit, so as to acquire the weight of the processed product,
wherein the data logger unit further executes processing amount correction for adding weight of a processing material, the weight of a processing material being lost during working, to the weight of the processed product and outputs weight subjected to the processing amount correction.

2. The weighing system according to claim 1, wherein the marker is a mark, a line, a figure, or a frame for defining a region including the display unit.

3. The weighing system according to claim 1, wherein the marker is a sticker which can be attached on a surface of the electronic scale.

4. A terminal device, comprising:
a camera;
a processor;
an output device; and
a non-transitory computer-readable storage medium storing thereon a computer-readable code, which when run in the processor causes the terminal device to:
acquire by using the camera an image of a display unit of an electronic scale that measures weight of a processed product, the display unit displaying the weight of the processed product;
perform character recognition processing within a region of the image indicated by a marker that is provided in a vicinity of the display unit based on the image so as to acquire the weight of the processed product;
process amount correction for adding weight of a processing material, the weight of a processing material being lost during working, to the weight of the processed product; and
output weight subjected to the amount correction to the output device.

5. The terminal device according to claim 4, wherein the terminal device is a portable information processing terminal.

6. The terminal device according to claim 4, wherein the marker is a mark, a line, a figure, or a frame for defining a region including the display unit.

7. The terminal device according to claim 4, wherein the marker is a sticker which can be attached on a surface of the electronic scale.

* * * * *